(12) United States Patent
Kim et al.

(10) Patent No.: US 8,067,062 B2
(45) Date of Patent: Nov. 29, 2011

(54) CARBON NANO TUBE ELECTRODE FORMED BY DIRECTLY GROWING CARBON NANO TUBE ON SURFACE OF CARBON PAPER AND SUPPORTING PLATINUM-BASED NANO CATALYST ON CARBON NANO TUBE USING CVD METHOD AND MANUFACTURING METHOD THEREOF

(75) Inventors: Hee-Yeon Kim, Daejeon (KR); Nam-Jo Jeong, Daejeon (KR); Seung-Jae Lee, Daejeon (KR); Kwang-Sup Song, Daejeon (KR)

(73) Assignee: Korea Institute of Energy Research, Daejeon (KR)

( * ) Notice: Subject to any disclaimer, the term of this patent is extended or adjusted under 35 U.S.C. 154(b) by 911 days.

(21) Appl. No.: 11/953,503

(22) Filed: Dec. 10, 2007

(65) Prior Publication Data
US 2008/0199696 A1 Aug. 21, 2008

(30) Foreign Application Priority Data
Feb. 15, 2007 (KR) .................. 10-2007-0015801

(51) Int. Cl.
*C23C 16/00* (2006.01)
(52) U.S. Cl. ............. 427/249.1; 427/430.1; 427/255.28; 427/299; 977/842; 977/843; 977/890; 977/891
(58) Field of Classification Search ............. 427/430.1, 427/249.1, 299
See application file for complete search history.

(56) References Cited

U.S. PATENT DOCUMENTS

| 2003/0111334 A1 | 6/2003 | Dodelet et al. |
| 2004/0167014 A1 | 8/2004 | Yan et al. |
| 2005/0074392 A1* | 4/2005 | Yang et al. .................. 423/447.3 |

(Continued)

FOREIGN PATENT DOCUMENTS

EP 1 667 271 A1 6/2006
(Continued)

OTHER PUBLICATIONS

Wang et al. High performance of low electrocatalysts loading on CNT directly gown on carbon cloth for DMFC. Journal of Power Sources (2007) 55-62.*

(Continued)

*Primary Examiner* — David Turocy
(74) *Attorney, Agent, or Firm* — Sherr & Vaughn, PLLC

(57) ABSTRACT

A platinum-based nano catalyst supported carbon nano tube electrode and a manufacturing method thereof, more particularly to a manufacturing method of a carbon nano tube electrode and a carbon nano tube electrode supported with the platinum-based catalyst by growing the carbon nano tube on the surface of the carbon paper and using a CVD method on the surface of the carbon nano tube. By growing the carbon nano tube directly, the broad surface area and excellent electric conductivity of the carbon nano tube can be utilized maximally, and especially, the nano catalyst particles with minute sizes on the surface of the carbon nano tube by using the CVD method as a supporting method of the platinum-based catalyst on the surface of the carbon nano tube, the amount of the platinum can be minimized and still shows an efficient catalyst effect and by improving the catalyst activity by increasing the distribution, so academic and industrial application in the future is highly expected.

17 Claims, 11 Drawing Sheets

U.S. PATENT DOCUMENTS

| | | | |
|---|---|---|---|
| 2005/0220988 A1 | 10/2005 | Dodelet et al. | |
| 2006/0172179 A1* | 8/2006 | Gu et al. | 429/44 |
| 2007/0144942 A1* | 6/2007 | Tiitta et al. | 208/137 |

FOREIGN PATENT DOCUMENTS

| | | |
|---|---|---|
| EP | 1 753 057 A1 | 2/2007 |
| JP | 2002-324557 | 11/2002 |
| JP | 2006-156387 | 6/2006 |
| KR | 10-0459060 | 3/2004 |
| KR | 10-0561856 | 7/2005 |
| KR | 10-2005-0119765 | 12/2005 |
| KR | 10-0722093 | 4/2007 |
| WO | WO 01/85612 A2 | 11/2001 |
| WO | WO 02/81371 A2 | 10/2002 |

OTHER PUBLICATIONS

Li et al. The effect of the Pt deposition method and the support on Pt dispersion on carbon nanotubes. Electrochimica Acta 51 (2006) 5250-5258.*

Villers et al. Characterization of Pt Nanoparticles deposited onto Carbon Nanotubes Gweorn on carbon paper and evaluation of this electrode for the reduction of oxygen. J. Phys. Chem. B. 2006, 110, 25916-25925.*

Wang et al. Proton Exchange Membrane Fuel Cells with Carbon Nanotube Based Electrodes. Nano Letters, 2004, vol. 4, No. 2 345-348.*

Waje et al. Deposition of platinum nanoparticles on organic functionalized carbon nanotubes grown in situ on carbon paper for fuel cells. Nanotechnology 16 (2005) S395-S400.*

Hamaguchi et al.; Synthesis of Carbon Nanotubes (CNTs) on Carbon Paper and Application to Alkaline Fuel Cell Anode; p. 454.

Villers et al.; Char. of Pt Nanopar. Dep. onto Carbon Nan. Grown on Carbon Paper and Eval. of This Elec. For Red. Of Ox.; J. Phys. Chem. B2006, 110, pp. 25916-25925.

He et al.; Dep. And Electr. Prop. of Plat. Nanopart. on Carb. Nan. For Meth. Electro.; Mat. Chem. And Phys. 85, 2004, pp. 396-401.

Wei et al.; Electrochem. Dep. of PtRu on an uncatalyzed Car. Electr. For Meth. Electr.; Journ. of Elektr. Chem.; 569, 2004, pp. 23-33.

European Patent Office, European Search Report, Jun. 20, 2008.

* cited by examiner

CARBON NANO TUBE ELECTRODE FORMED BY DIRECTLY GROWING CARBON NANO TUBE ON SURFACE OF CARBON PAPER AND SUPPORTING PLATINUM-BASED NANO CATALYST ON CARBON NANO TUBE USING CVD METHOD AND MANUFACTURING METHOD THEREOF

The present application claims priority under 35 U.S.C. 119 to Korean Patent Application No. 10-2007-0015801 (filed on Feb. 15, 2007), which is hereby incorporated by reference in its entirety.

TECHNICAL FIELD

Embodiments relates to a method for manufacturing a carbon nano tube electrode by growing a carbon nano tube on the surface of a carbon paper and supporting a platinum-based nano catalyst on the carbon nano tube using chemical vapor deposition (CVD) method and a platinum-based nano catalyst manufactured from the same; and, more particularly, to a method for manufacturing a carbon nano tube electrode by supporting nickel, cobalt, iron or the composition thereof on the surface of the carbon paper with improved wettability through acid treatment by using ultrasonic or electro-chemical methods, growing a carbon nano tube by flowing a carbon source, removing the nickel, cobalt, iron or the composition of thereof from the surface of the carbon nano tube graphite grown by using the method through an acid treatment to improve the surface structure and finally supporting the platinum-based catalyst on a surface of the carbon nano tube by using the CVD method which selectively adheres vapor phase platinum precursor to the detects of the carbon nano tube and a platinum-based nano catalyst manufactured from the same.

BACKGROUND

As a carbon nano tube is excellent in electric conductivity, surface area, and hydrogen storage, it is desirable to be used as a catalyst supporter, particularly as an electrode of a fuel cell. However, until now, researches on carbon nano tube have been performed mainly on its composition. Its applications made little progress and especially, there have been little attempts to utilize the carbon nano tube as a catalyst supporter. The carbon nano tube has a strong point that it can prevent the cohesion of particles when supporting metal particles due to the particular surface structure.

The platinum-based catalyst is a precious metal and is commonly used in hydrogenations and reforming reactions and has problems of high manufacturing cost in spite of the high activity compared to other metal catalysts.

Therefore, in order to solve these problems, it is important to maximize the number of the catalyst activity point using the minimum amount of platinum by minimizing the size of the platinum particle in a catalyst active state and supporting in high dispersion state. In order to do this, the surface area of the supporter which supports the catalyst should be excellent and the catalyst particle should not condense on the surface of the supporter during the supporting process.

At present, during the electrode manufacturing process, various carbon materials are used as a support of the platinum-based catalyst, there have been few cases that used carbon nano tube until now. In case the carbon nano tube is used as catalyst supporter for electrode of a fuel cell, due to the high electricity conductivity, hydrogen storage, and mechanical hardness, and excellent surface area, the performance of the electrode can be improved remarkably.

Also, the manufacturing process of the electrode for fuel cell in accordance with a related art adopted a "paste method" for a method for pasting the platinum-based supporting carbon catalyst on the carbon paper, there exists a weak point that the activity of the platinum-based catalyst is blocked during the process. On the other hand, in case when the carbon nano tube is grown directly on the surface of the carbon paper and supporting the platinum-based catalyst, the large surface area of the carbon nano tube can be used as it is and has an advantage that the reaction activity can be remarkably improved as all supported platinum-based catalyst particles are not blocked to be able to participate in the reaction.

The followings are references related to contents that the carbon nano tube is grown on the carbon electrode surface for being utilized as an electrode for a fuel cell.

Japanese Patent Publication No. 2004-59428A discloses a manufacturing method of a carbon nano tube electrode for being used as an electrode for a fuel cell, after scattering a metal catalyst using electrophoresis, spraying, sputtering, or CVD, composing a carbon nano tube using a CVD method which uses ethylene, carbon oxide, carbon dioxide, acetylene, and methane as a carbon source and raises temperature up to 400~900° C., or the carbon nano tube can be composed using a plasma CVD.

PCT International Publication No. WO 2006/080702 A1 discloses a method which makes a nano compound including a carbon nano tube and applies this to the electrode for a fuel cell to improve the performance of the fuel cell remarkably. The method composes the carbon nano tube by supporting the nickel, cobalt, iron or the composition thereof to a carbon cloth or to a carbon fiber by sputtering, evaporation, CVD, or electroplating or electroless plating methods and flowing carbon sources. In here, in order to minimize a blockage area by growing nano tubes in a borough shape additionally following the surface of the nano tube grown at beginning, a DC plasma CVD method is used.

According to the Zhibin et al. in Materials Chemistry and Physics (vol. 85 (2004) P. 396), carbon nano tube is grown on the surface of a graphite disk and a platinum is supported to be used in a methanol fuel cell directly. They electrically supported an iron catalyst to surface of the graphite disk using a galvanostatic method, after growing the carbon nano tube using a CVD method, and supported the platinum particles in an electro-chemical method using a potentiostatic method. A scanning electrode microscope analysis result shows the size of the platinum particle to be 60-80 nm.

However, although there have been various attempts to utilize a carbon nano tube to an electrode for a fuel cell, there has been no example that uses a CVD method for effectively supporting platinum-based catalyst particles to the surface of the carbon nano tube in a nano scale after growing the carbon nano tube on a carbon paper directly.

SUMMARY

Embodiments have been proposed in order to improve the performance of an electrode for a fuel cell and provide a method manufacturing for a platinum-based nano catalyst by using a method that directly grows a carbon nano tube on a carbon paper surface in order to manufacture the carbon nano tube with uniform thickness in high density and dispersion and supporting nano scale platinum particles in a high dispersion state using CVD which is a new nano catalyst supporting method and a platinum-based nano catalyst manufactured from the same.

In order to solve the above problems, embodiments provide a method for manufacturing a carbon nano tube electrode supported with a platinum-based catalyst which grows the carbon nano tube directly on the surface of a carbon paper and supports the platinum-based nano particle on the surface of the grown carbon nano tube by using a CVD method.

Embodiments also includes the steps of:

(A) pre-treating the surface of the carbon paper for growing a carbon nano tube;

(B) supporting catalyst metals such as the particles of nickel, cobalt, iron or the composition thereof for growing the carbon nano tube on the surface of the pre-treated carbon paper;

(C) flowing a carbon source in a vapor phase on the surface of the carbon paper which is supported with a catalyst metal and growing the carbon nano tube by sustaining an appropriated temperature;

(D) removing nickel, cobalt, iron or the composition thereof which has been used as a catalyst from the grown carbon nano tube and pre-treating the surface of the carbon nano tube for supporting the platinum-based nano catalyst; and (E) supporting the platinum-based nano catalyst by flowing the platinum precursor in a vapor phase to the carbon nano tube which is grown on the surface of the pre-treated carbon paper for a platinum-based catalyst supporting.

Embodiments also provides a carbon nano tube electrode supported with a platinum-based nano catalyst which is manufactured by growing the carbon nano tube directly on the surface of the carbon paper and supporting platinum using CVD method on the surface of the grown carbon nano tube.

In accordance with embodiments, the weak point that the catalyst activity is blocked as platinum supported carbon tubes gets overlapped each other in case when a paste method, a electrode manufacturing method in accordance with a related art, which pastes platinum-based catalyst on a carbon paper can be solved, the broad surface area and excellent electricity conductivity of a carbon nano tube can be utilized in maximum, and has a strong point that the durability of an electrode is increase as moisture which is by product generated during the operation of a fuel cell can be easily discharged as oriented vertically. Also, in order to support catalyst metal particles (nickel, cobalt, iron or the composition thereof) for growing a carbon nano tube on the surface of a carbon paper, an electro-chemical method can be used, the size and the distribution of the metal particle can be controlled by controlling the applied voltage and the density of the precursor solution, and these electro-chemical supporting technology can be used as a method for supporting the platinum particle on the surface of the carbon nano tube.

Also, by using the CVD as a supporting method of the platinum-based catalyst on the surface of the carbon nano tube, it is highly expected there would be academic and industrial application in the future by enabling supporting 1~2 nm sized nano catalyst particles on the surface of the carbon nano tube, improving the catalyst activity by increasing the distribution, and minimizing the doze of platinum and still achieving an efficient catalyst effect.

DRAWINGS

DESCRIPTION

Hereinafter, embodiments of the present invention will be described in detail with reference to the accompanying drawings.

Figure 1:
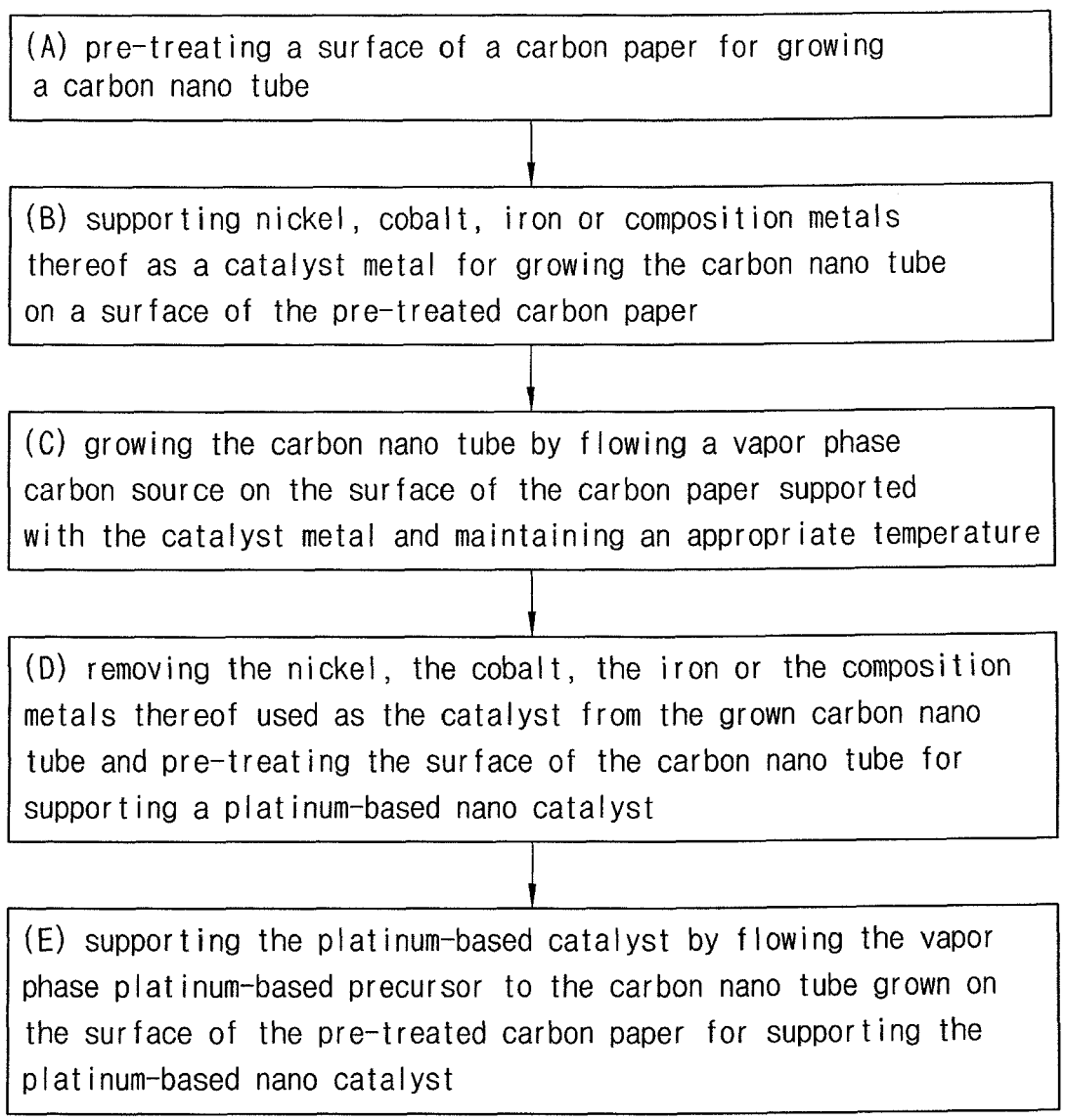
FIG. 1 shows a schematic flowchart illustrating the manufacturing method in accordance with embodiments.

FIG. 1 is a schematic flowchart illustrating a manufacturing method of a carbon nano tube in accordance with embodiments.

Step (A) is performed by treating several times at a uniform voltage as a step for increasing the wettability of the surface of the carbon paper after the carbon paper is submerged on a sulphuric acid solution. Desirably, in order to increase the wettability of the surface of the carbon paper, after the carbon paper is submerged in the sulphuric acid solution 0.1~0.5 mol, it is treated 10~60 cycles at −0.15~1.3 V with the sweep rate (scanning speed) at 50 mV/s. Herein, the density of the sulphuric acid solution varies according to the material and the structure of the carbon paper, a surface treatment effect is deteriorated when the density is below 0.1 mol, and the carbon paper can be eroded when the density is above 0.5 mol. The range of the application voltage is between −0.15-1.3 V and the carbon paper can be damaged beyond the range. The number of treatments is also controlled according to the material of the carbon paper or the density of the sulpheric acid solution density, the treatment effect is very small below 10 cycles and can cause damage of the carbon paper beyond 60 cycles.

Step (B) can use an ultrasonic method or an electro-chemical method as a step for supporting catalyst metals such as the particles of nickel, cobalt, iron or the composition thereof for growing carbon nano tube on the surface of the carbon paper.

The ultrasonic method is a method to apply ultrasonic wave after a carbon paper dried after the sulphuric acid treatment is submerged into a precursor solution which dissolved nitrate or acetate based nickel, cobalt, iron compositions or the composition thereof.

Desirably, metal particles is uniformly dispersed to the surface of the carbon paper by repeating a step of applying ultrasonic waves 1~10 times after the carbon paper dried after the sulphuric acid treatment is submerged in a solution (0.1~1 mol) which uses nitrate or acetate based nickel, cobalt, iron compositions or the composition thereof. Herein, when the density of the precursor solution is below 0.1 mol, it is difficult to support in the carbon paper, and when the density is beyond 1 mol, there is a tendency that metal particles clusters as a shape of a big mass even if the supporting amount is large. The metal supporting amount increases as the supporting times increases and in case repeating the supporting steps, in the middle, the metal particle should be effectively supported through a drying process in the air.

The step of supporting catalyst metals such as metal particles of nickel, cobalt, iron or the composition thereof for growing carbon nano tube at the surface of the carbon paper can be processed with an electro-chemical method. With this method, a three electrode cell is installed by connecting a saturated calomel electrode as a reference electrode, a platinum electrode as a counter electrode, a carbon paper as a working electrode, and there electrodes are submerged in precursor solution, after controlling the supporting amount of the metal particles is controlled by repeating several times within a certain range of voltages, and the graphite electrode supported with the nickel, cobalt, iron or the composition thereof is picked out from the solution and is dried in a oven to remove moisture.

In embodiments, the procedure includes those steps to support metal particles on the surface of the carbon paper: installing a three electrode cell with a saturated calomel electrode as a reference electrode, a platinum electrode as a counter electrode, a carbon paper with the width within 4 cm and the length within 20 cm so that the paper can be fit within the uniform temperature range within a quartz tube as a working electrode; submersing those electrodes into 0.1~1 mol solution of nickel, cobalt, iron or the composition thereof, controlling the supporting amount of metal particles varying voltages between the range of (−)2.5-2.5V and repeating at 10-600 cycles with a sweep rate at 10 m-50 mV/sec; picking up the graphite electrode supported with the nickel, cobalt, iron or the composition thereof and drying it in an oven at 100~120° C. for 12~24 hours.

In the above, the temperature in the oven is for removing moisture, it is hard to remove moisture at below 100° C. and when heated at a temperature higher than 120° C., the material can be deformed. To be dried completely, 12~24 hours of drying is necessary.

In the above procedure, as metal particles tend to cluster when the applied voltage to the supporting of the nickel, cobalt, iron or the composition thereof is beyond the range of −2.5~2.5V, the voltage is made to vary at a middle range between two values, the supporting amount is too small when the repeating is below 10 cycles and the size of particle tend to increase when it exceeds 600 cycles.

The illustrated step (C) is a step which grows a carbon nano tube by inflowing a vapor phase carbon source on the surface of the carbon paper and sustaining a uniform temperature. Embodiments include the steps of: installing a carbon paper supported with nickel, cobalt, iron or the composition thereof in the middle of the Quartz tube in a furnace and flowing nitrogen; additionally flowing in hydrogen for reducing metal particle and raising temperature then sustaining the temperature; and raising the temperature continuously and flowing a carbon source when the temperature inside of the quartz tube gets at a certain point to grow the carbon nano tube on the surface of the carbon paper for a certain amount of time.

Figure 2:
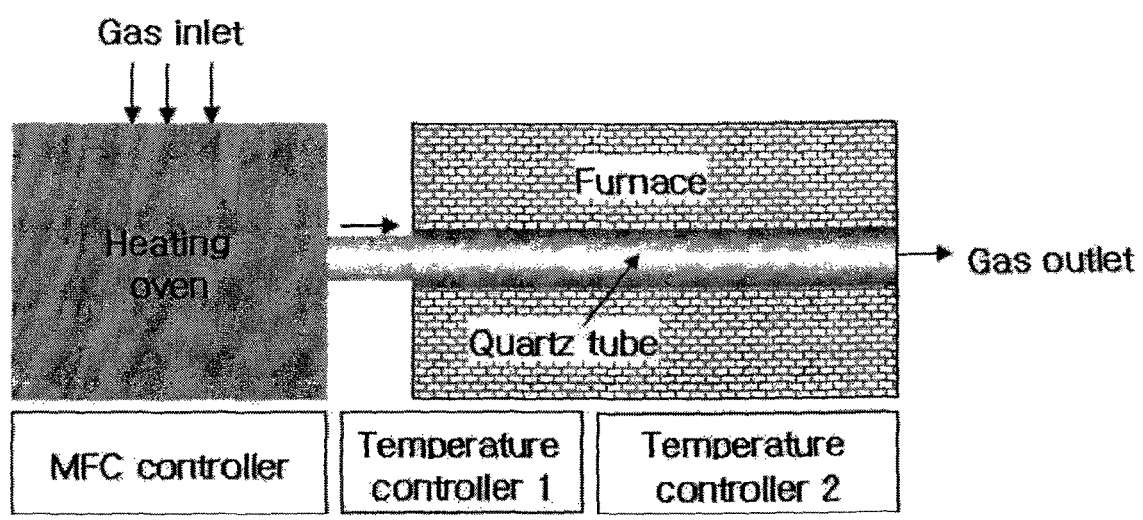
FIG. 2 is block diagram illustrating the embodiments in accordance with embodiments.

In embodiments, impurities can be removed by installing the carbon paper supported with nickel, cobalt, iron or the composition thereof in the middle of the quartz tube inside of the furnace in FIG. 2 and sustaining the internal pressure depressurized at 6-10 torr more than 30 minutes. Next, the inside is made inactive by inflowing 50-300 standard cubic centimeter per minute (sccm) of nitrogen at a room temperature more than 1 hour. The flow within the quartz tube can be made inhomogeneous when the inflow of nitrogen is less than 50 sccm, and it is hard to get a staying time for reaction when it is more than 300 sccm.

For the reduction of the nickel, cobalt, iron or the composition metal thereof at an oxide state, with hydrogen (30-150 sccm) is additionally flown, the reduction temperature of the metal component is raised up to 400-500° C. and this temperature is maintained for 2 hours to completely reduce metal substance. And, the temperature is continuously increased at a speed of 10° C./min. Then, when the inside temperature of the quartz tube reaches at 600-800° C. where the carbon nano tube grows actively, the carbon nano tube begins to grow on the surface of the carbon paper when methane, ethanol, or xylem which is used as a carbon source is flown at 10-300 sccm. In embodiments, it may be desirable to reduce the flowing amount closer to 10 sccm as the number of carbon within a molecule of a carbon source increases and to apply a high flow amount more than 100 sccm when the number of carbon is small in case such as methane. This state is maintained 30 min-6 hours and the reaction time is controlled in accordance with the used carbon source and a desired growing shape (length, density, thickness, etc.) of the carbon nano tube.

The illustrated step (D) is a step that removes metal substances used as a catalyst on a grown carbon nano tube on the surface of the carbon paper, performs a pre-treatment of the surface of the carbon paper for a platinum-based nano catalyst supporting, and can perform hydrochloric acid treatment for removing the metal component of nickel, cobalt, iron or the composition thereof used as a catalyst in a carbon nano tube grown on the surface of the carbon paper. This method includes those steps of: submerging the carbon paper with the carbon nano tube grown on it into the hydrochloric acid solution, maintaining for a certain amount of time, rising with distilled water and drying in an oven; submerging the material in a mixture acid solution and relaxing at a certain temperature for improving the wettability of the surface of the carbon nano tube, substituting oxidation radicals and creating defects; and rinsing the treated material with distilled water a number of times and drying in an oven.

In embodiments, the hydrochloric acid treatment is performed in order to remove the metal component of nickel, cobalt, iron or the composition thereof used as a catalyst in a carbon nano tube grown on the surface of the carbon paper, the carbon paper with the carbon nano tube grown on the surface, submerged in a 6-10 mol hydrochloric acid solution and is maintained for 6-24 hours, rinsed with distilled water and is dried in an over at 100-120° C. for 12-24 hours. It may be hard to remove moisture when the temperature in the oven is below 100° C. and when heated at a temperature higher than 120° C., the material can be deformed. To be dried completely, 12~24 hours of drying is necessary. When the density of the hydrochloric acid becomes below 6 mol, the effect of treatment is deteriorated, and the surface of the carbon paper can be eroded when the density exceed 10 mol.

After that, for improving the wettability of the surface of the carbon nano tube, substituting oxidation radicals and creating defects, the material is submerged in a mixture acid solution (14M of nitric acid and 98% sulphuric acid is mixed with a volume ratio of 1:1), refluxed at 50~70° C. for 5~360 minutes. The mixture acid solution reveals maximum treatment results when mixing the nitric acid and the sulphuric acid with a ratio of 1:1. The treatment effect is deteriorated when the mixture acid density is below the above value and can severely erode the surface when the density is higher than the ratio on the contrary. Also, the treatment is most effective above the 50° C. of application temperature and at a temperature higher than 70° C., the mixture acid can evaporate violently. The treatment hours should be varied according to the structure of the carbon nano tube and the carbon paper, and for a formation of a light defect, it is controlled around 5 minutes. The carbon paper and the carbon nano tube can be severely deformed more than 360 minutes' treatment.

The treated material should be rinsed with distilled water a number of times and moisture should be removed by drying the material in an oven at a temperature 100-120° C. for 12-24 hours. It is hard to remove moisture when the temperature in the oven is below 100° C. and when heated at a temperature higher than 120° C., the material can be deformed. To be dried completely, 12~24 hours of drying is necessary.

The illustrated step (E) is a step that supports the platinum-based nano catalyst by flowing in gas platinum precursor into the carbon nano tube grown on the surface of the carbon paper and includes those steps of:

removing impurities by installing the carbon paper with a carbon nano tube grown through those steps (A)~(D) on the surface in the middle of a quartz tube and maintaining a certain temperature and pressure for a certain amount of time;

maintaining for a certain amount of time with flowing in nitrogen to the carbon paper; raising the temperature inside of the quartz tube for platinum-based nano catalyst supporting using CVD method; and flowing the platinum precursor in a vapor phase at a point when the reaction temperature is reached and maintaining the temperature for a certain duration to support platinum particles on the surface of the carbon nano tube.

In embodiments, impurities are removed by installing the carbon paper with a carbon nano tube grown through those steps (A)~(D) on the surface in the middle of a quartz tube and maintaining the pressure of 6-10 Torr at a temperature of 100-120° C. for 30 minutes, nitrogen is flown in at 50-300 sccm and is maintained more than 1 hour. The temperature inside of the quartz tube is raised up to 80-300° C. at a temperature raising speed of 10° C./min for platinum-based platinum-based particle nano catalyst supporting using CVD method, and the platinum particle is supported on surface of the carbon nano tube by starting to flow in the vapor phase platinum precursor at a point when the reaction temperature is reached.

In order to support the platinum particle on the surface of the carbon nano tube grown on the carbon paper, platinum precursor (methyl tri methyl cyclopentadienyl platinum is installed inside of the evaporator installed inside of the heating oven appearing in the left of FIG. 2 and is heated at a temperature 60-80° C. to evaporate the precursor.

When the temperature of the precursor reaches a certain temperature, the vapor phase platinum precursor is transferred to the carbon paper installed inside of the quartz tube following the flow of the nitrogen gas by changing the path of the nitrogen which has been flown into the inside of the quartz tube directly to flowing following the evaporator, the temperature of the connecting tube which connects the oven where the evaporator is installed and the heating road which heats the quartz tube should be maintained the same, and the point when the platinum precursor starts to flow into the quartz tube should be coincided with the point when the temperature of the carbon paper reaches the reaction temperature.

In embodiments, when the temperature of the precursor reaches 60~80° C., by changing the path of the nitrogen which was flown into the inside of the quartz tube at 10-300 sccm is changed to flow in following the evaporator, the vapor phase platinum precursor is made to be transferred to the carbon paper installed inside of the quartz tube following the flow of nitrogen which is a carrier gas. At this time, the temperature of the connecting tube which connects the oven where the evaporator is positioned and the heating road which heats the quartz tube is maintained at 60-80° C. also where the precursor completely evaporates, the time point when the platinum precursor starts to flow into the quartz tube is made to coincide with the time point when the temperature of the carbon paper reaches the reaction temperature 80-300° C., and the temperature is maintained for a certain period of time (30 minutes-24 hours). The reaction time can be controlled according to the desired amount of the platinum support and can be more than 24 hours when the supporting amount is made to be maximized.

The platinum-based nano catalyst manufactured through the above procedure grows the carbon nano tube on the surface of the carbon paper directly and the feature of the surface of the carbon nano tube with an improved surface structure supported with platinum-based nano catalyst is recognized with the result of a scanning electron microscope.

The carbon nano tube supported platinum-based nano catalyst electrode as a result of the embodiments improves the performance of the electrode for a fuel cell with using a less amount of platinum precursor compared with carbon electrodes which supports platinum with impregnation method and is pasted with carbon catalyst powder by a paste method in accordance with a prior art, and these manufacturing method can be applied to the manufacturing procedure of secondary batteries.

Hereinafter, preferred embodiments of the present invention will be described in detail with reference to the accompanying drawings and the effect of the present invention will be proved in comparison with comparing examples.

Embodiment 1

A. Pre-treatment Step of Carbon Paper for Growing Carbon Nano Tube:

In order to increase the wettability of the surface of the carbon paper, the carbon paper with both width and the length of 2 cm is submerged into 0.5 mol sulphuric acid solution and is treated 60 cycles at –0.15~1.3V with the sweep rate at 50 mV/s. The treated carbon paper is rinsed with distilled water a number of times and is dried on an oven at the temperature of 110° C. for 12 hours.

B. Catalyst Supporting Step for Growing Carbon Nano Tube on the Surface of the Pretreated Carbon Paper:

The pretreated carbon paper at the step A is submerged in a Nickel solution (0.2 mol) which uses nickel nitrate as a precursor, then is treated with ultrasonic wave (60 Hz) for 5 minutes, and this procedure is repeated 5 times to support nickel on the surface of the carbon paper. Between each steps of nickel supporting process, the nickel particle is made to be effectively supported through a drying process in the air.

Figure 3:
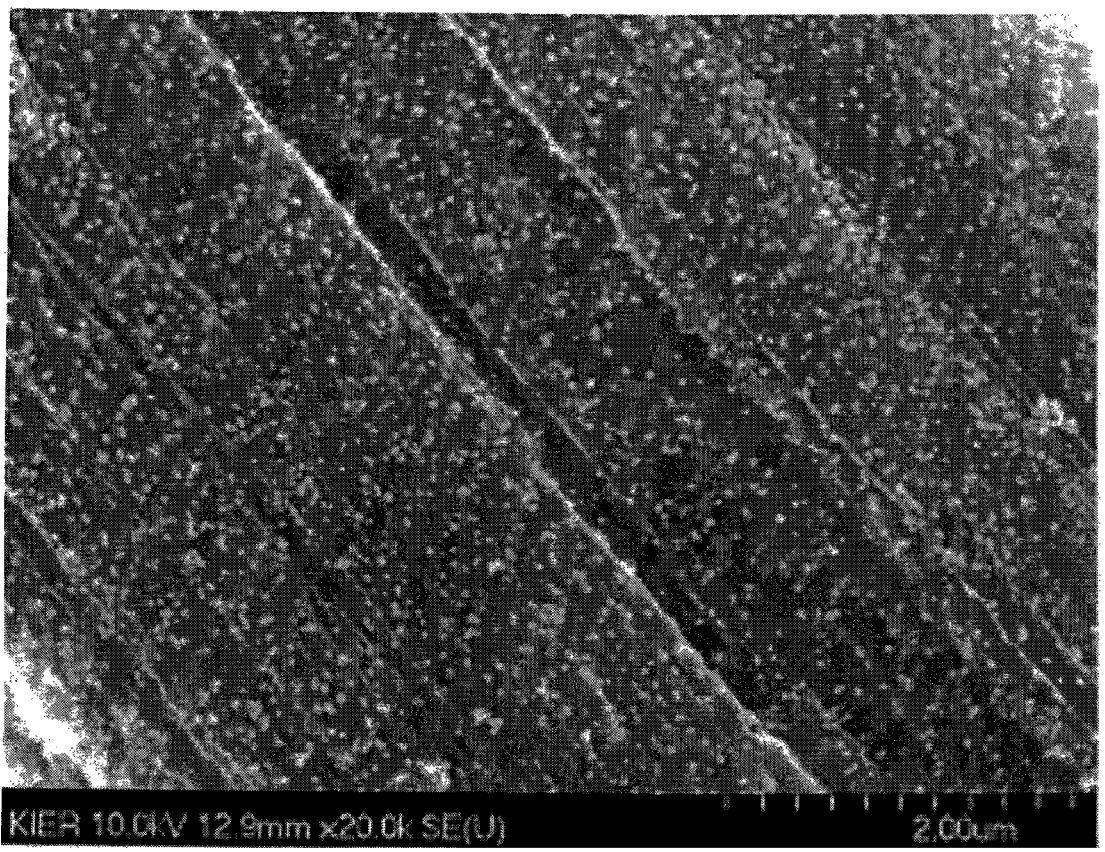
FIG. 3 is an SEM picture illustrating the surface of the embodiment 1 at a state when the step B is completed (nickel catalyst for CNT growth is supported).

The SEM picture of the surface of the carbon paper supported with gained nickel is illustrated in FIG. 3. It is possible to identify uniformly supported 10-30 nm sized nickel particles.

Figure 4A:
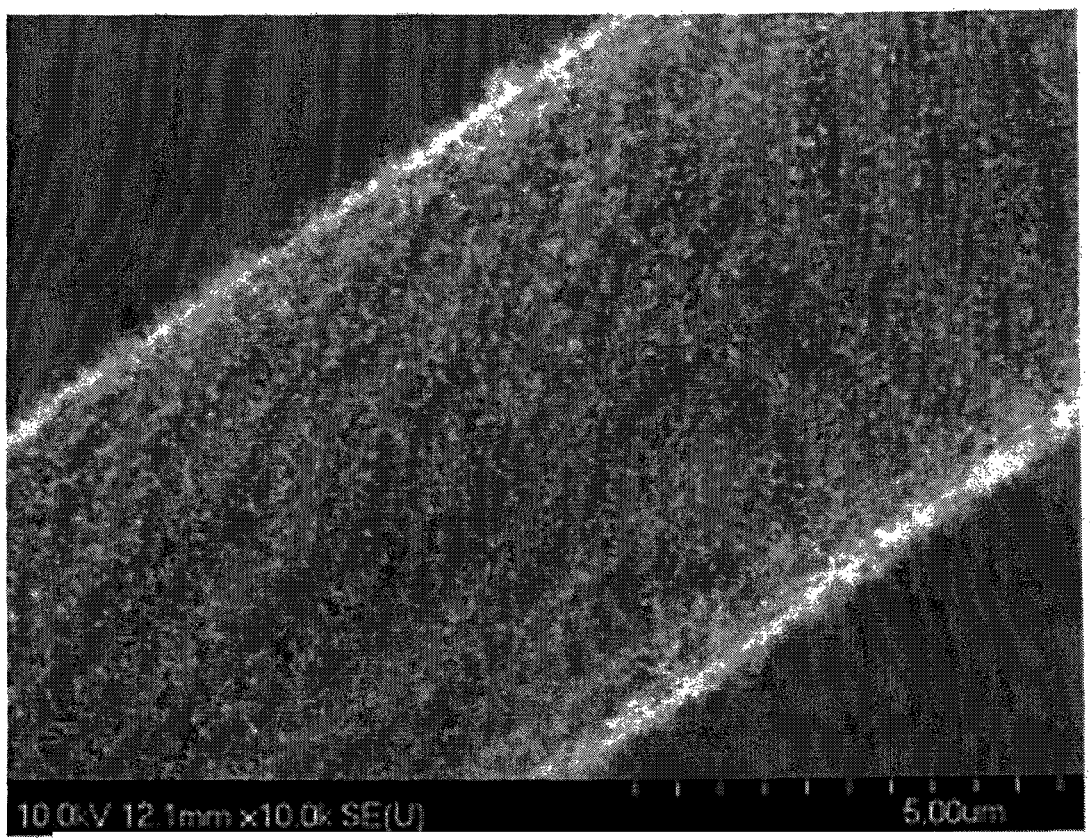
FIG. 4a is an SEM picture illustrating the surface of the embodiment 1 at a state when the step C is completed (growing the carbon nano tube)

C. Step of Growing Carbon Nano Tube on the Surface of the Carbon Paper:

The carbon paper supported with nickel which is gained at step B is installed in the middle of the quartz tube installed inside of the heater positioned to the right in FIG. 2 and nitrogen (100 sccm) is flown at room temperature for one hour after maintaining for the internal pressure of the quartz tube at 6-10 Torr for 30 minutes. And, in order to reduce the nickel metal, hydrogen (100 sccm) is additionally flown and temperature is raised up to 500° C. at the temperature raising speed of 10° C./min and is maintained at this temperature for 2 hours. Next, the internal temperature of the quartz tube is raised up to 700° C. with the temperature raising speed of 10° C./min and the carbon nano tube begins to grow on the surface of the carbon paper when methane gas which is the carbon source begins to be flown. The carbon source is flown for 2 hours for the growth of the carbon nano tube and the carbon paper which has gone through the reaction is collected to be analyzed by the picture of the SEM. The picture of the SEM is illustrated in FIG. 4a, and it is possible to identify the carbon nano tube with the diameter of 20 nm in most and dispersion within 10-30 nm range has been grown uniformly.

D. Pre-Treating Step of Pre-processing the Surface of the Carbon Nano Tube for Supporting Platinum-based Nano Catalyst:

In order to remove the nickel metal component used as a catalyst on at the carbon nano tube grown on the surface of the carbon paper, the carbon paper with the carbon nano tube grown on the surface is submerged in the 6 mol hydrochloric solution, maintained for 24 hours, and is dried in an oven at 110° C. for 12 hours after being rinsed with distilled water a number of times. And the material is submerged in a mixture acid solution (14 M, 50 ml of nitrate and 98% 50 ml of sulphuric acid) and is maintain for 10 minutes while being refluxed in order to improve the wettability of the surface of the carbon nano tube, to substitute oxidation radicals and to create defects to make it easy to support platinum-based nano catalyst. The treated material is rinsed a number of times with distilled water and is dried in an oven at the temperature of 110° C. for 12 hours.

E. Step of Platinum-based Nano Catalyst Supporting on the Surface of the Carbon Paper:

The carbon paper with the carbon nano tube grown through those steps of A-D is installed in the middle of the quartz tube of the device in accordance with FIG. 2 and impurities inside of the quartz tube are removed by maintaining the temperature at 110° C. and the pressure at 6-10 Torr for 30 minutes. And nitrated (100 sccm) is flown and is maintained for 1 hour. The carbon paper which is a substrate where the carbon nano tube would grow is heated up to 140° C. at the temperature raising speed of 10° C./min through a temperature programming and vapor phase platinum precursor starts to be flown into the quartz tube at the point where the final reaction temperature is reached.

The vapor phase platinum precursor is prepared in the flowing way. First, the platinum precursor is placed in the evaporator installed inside of the oven positioned to the left of the apparatus in accordance with FIG. 2 and is heated at the temperature of 70° C. in order to support the platinum particles on the surface of the carbon nano tube grown on the carbon paper. When the temperature inside of the evaporator reaches 70° C., the path of nitrogen (100 sccm) is switched from directly to the quartz tube to the evaporator and then to the quartz tube. At this time, the temperature of the connecting tube which connects the oven where the evaporator is placed and the heater where the quartz tube is placed is maintained at the temperature of 70° C.

Figure 5:
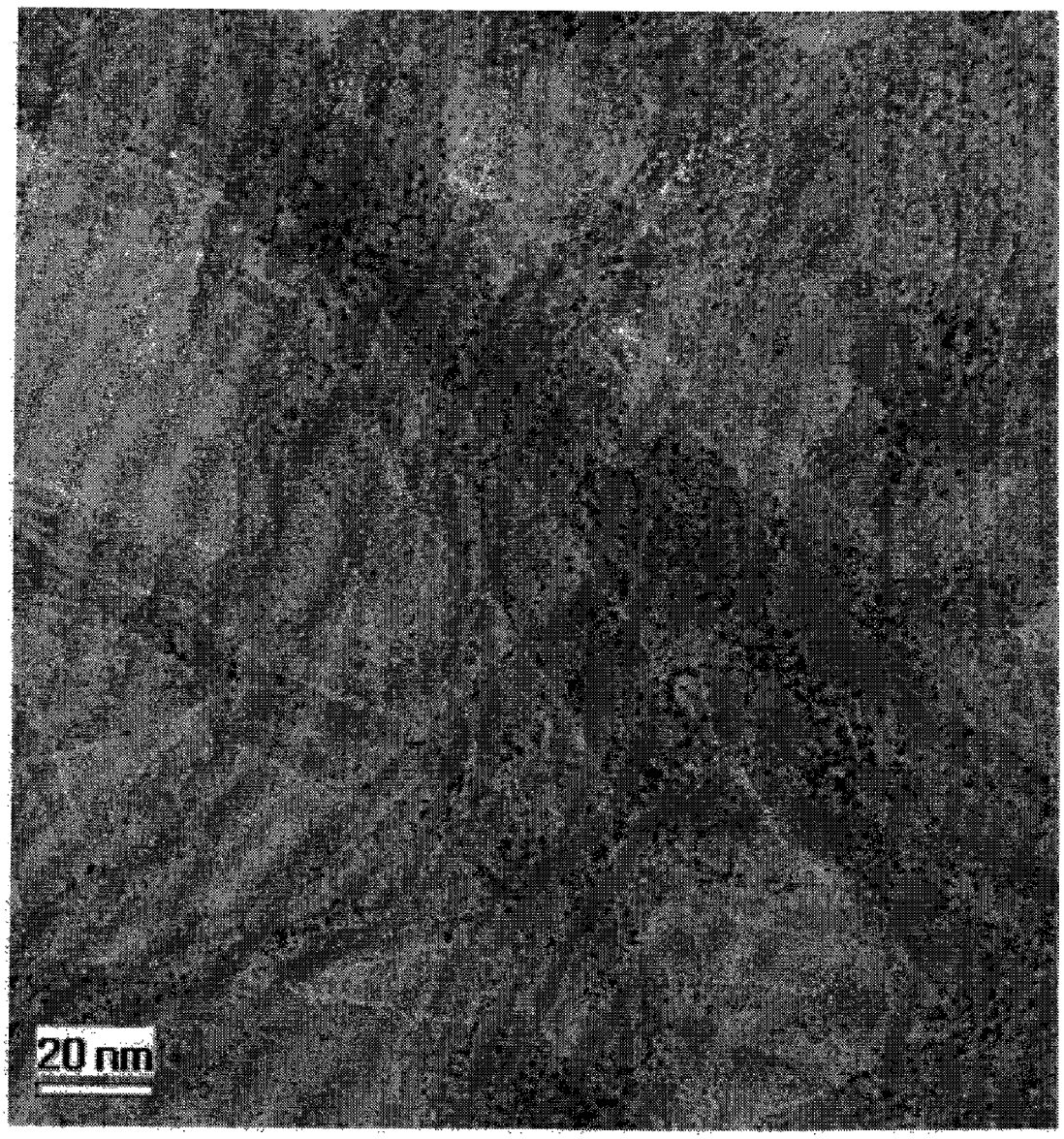
FIG. 5 is a TEM picture illustrating the surface of the embodiment 1 at a state when the step E is completed (supporting the platinum-based catalyst).

As previously stated, the vapor phase platinum precursor prepared in this way is flown into the quartz tube where the carbon paper is placed in from the point when the temperature of the carbon paper placed in the quartz tube reaches at 140° C. which is the reaction temperature, and this state is maintained for 5 hours so that the platinum-based nano catalyst can be supported on the surface of the carbon paper. The material gained through these processes is analyzed using a transmission electron microscope (TEM), and the picture of the TEM is illustrated in FIG. 5. It is possible to identify that 1-2 nm sized platinum particles are uniformly supported.

Embodiment 2

Steps are all the same with the steps through A~E in the embodiment 1, except of making the reaction temperature in the quartz tube where the carbon paper to which the vapor phase platinum is transferred to be 80° C., at step E, Embodiment 3

Steps are all the same with the steps through A~E in the embodiment 1, except of making the reaction temperature in the quartz tube where the carbon paper to which the vapor phase platinum is transferred to be 120° C., at step E.

Embodiment 4

Steps are all the same with the steps through A~E in the embodiment 1, except of making the reaction temperature in the quartz tube where the carbon paper to which the vapor phase platinum is transferred to be 160° C., at step E.

Embodiment 5

Steps are all the same with the steps through A~E in the embodiment 1, except of making the reaction temperature in the quartz tube where the carbon paper to which the vapor phase platinum is transferred to be 180° C., at step E.

Embodiment 6

Steps are all the same with the steps through A~E in the embodiment 1, except of making the reaction temperature in the quartz tube where the carbon paper to which the vapor phase platinum is transferred to be 220° C., at step E.

Embodiment 7

Steps are all the same with the steps through A~E in the embodiment 1, except of making the reaction temperature in the quartz tube where the carbon paper to which the vapor phase platinum is transferred to be 240° C., at step E.

Embodiment 8

Steps are all the same with the steps through A~E in the embodiment 1, except of making the reaction temperature in the quartz tube where the carbon paper to which the vapor phase platinum is transferred to be 270° C., at step E.

Embodiment 9

Steps are all the same with the steps through A~E in the embodiment 1, except of making the reaction temperature in the quartz tube where the carbon paper to which the vapor phase platinum is transferred to be 300° C., at step E.

Embodiment 10

Steps are all the same with the steps through A~E in the embodiment 1, except of flowing in oxygen (50 sccm) additionally instead of using nitrogen (100 sccm) as an reaction gas for supporting platinum particles on the surface of the carbon nano tube grown on the surface of graphite by using CVD, and making the reaction temperature in the quartz tube to be 80° C., at step E.

Embodiment 11~18

Steps are all the same with the steps in the embodiment 10, except making the reaction temperature in the quartz tube to be 120° C., 160° C., 180° C., 220° C., 240° C., 270° C., 300° C. respectively in the embodiments 11~18, at step E.

Embodiment 19

Steps are all the same with the steps through A~E in the embodiment 1, except flowing in hydrogen (50 sccm) additionally as an reaction gas for supporting platinum particles on the surface of the carbon nano tube grown on the surface of graphite by using CVD, and making the reaction temperature in the quartz tube to be 80° C., at step E.

Embodiment 20~25

Steps are all the same with the steps the embodiment 19, except making the reaction temperature in the quartz tube to be 120° C., 160° C., 180° C., 220° C., 240° C., 270° C., 300° C. respectively in the embodiments 11~18, at step E.

Embodiment 26

A. Pre-Treatment Step of Carbon Paper for Growing Carbon Nano Tube:

The same method illustrated in step A in the embodiment 1 was used.

B. Catalyst Supporting Step for Growing Carbon Nano Tube on the Surface of the Pretreated Carbon Paper:

Nickel particles are supported on the surface of the carbon paper using an electro-chemical method. A three electrode cell with a saturated calomel electrode as a reference electrode, a platinum electrode as a counter electrode, a carbon paper with the width and the length each of 2 cm is installed. Those electrodes are submerged into a 0.25 mol nickel solution and the voltage is varied between the range of (−)2.5-2.5V repeated at 10-600 cycles with a sweeping speed at 10 m-50 mV/sec. The size of the nickel particle varies in accordance with the amplitude of the voltage and the supporting amount is controlled in accordance with the repeating number. The graphite electrode supported with the nickel is picked up and is dried in an oven at the temperature of 110° C. for 12 hours.

Figure 4B:
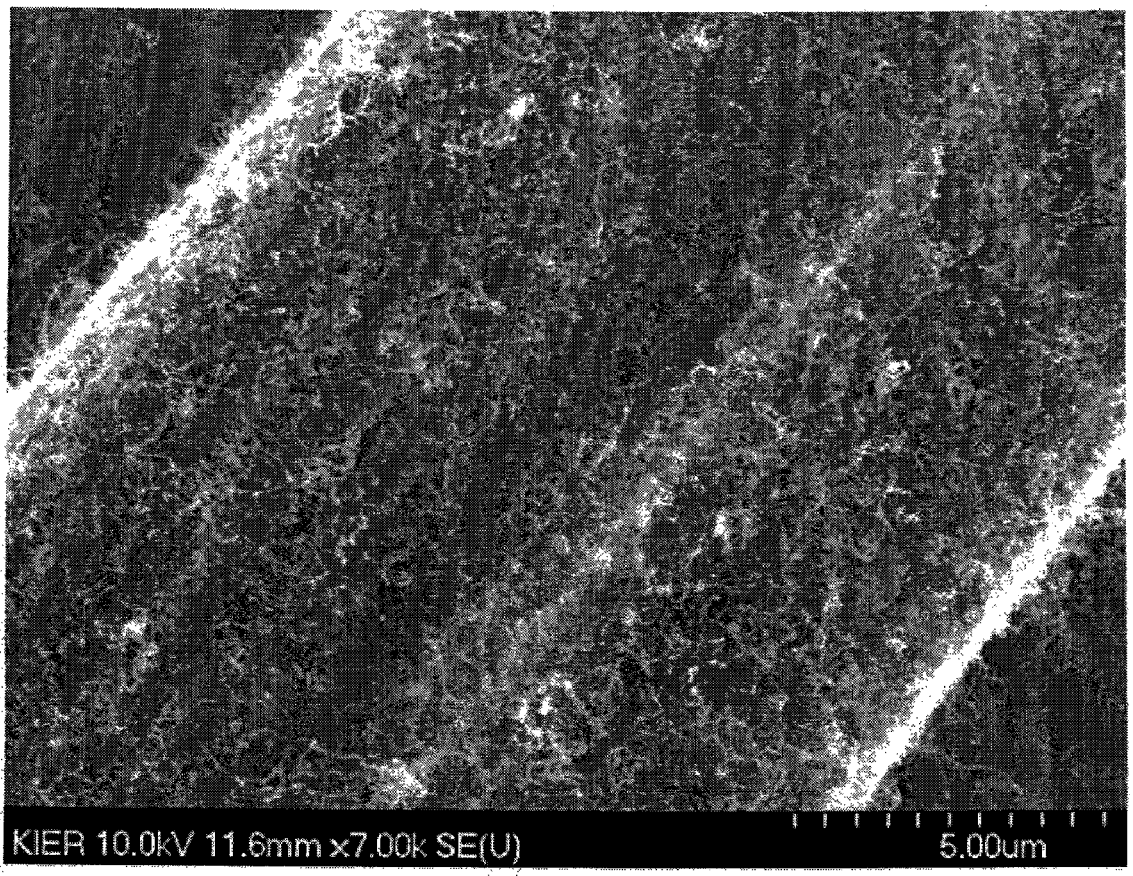
FIG. 4b is an SEM picture illustrating the surface of the embodiment 26 at a state when the step B is completed (growing the carbon nano tube).

C. Step of Growing Carbon Nano Tube on the Surface of the Carbon Paper:

After analyzing the surface of the material obtained by being treated with the same method with the step C of the embodiment 1 with the SEM, the picture is illustrated in FIG. 4b. When the Ni particle is supported with an electro-chemical method, it is possible to verify that the diameters of the carbon nano tubes appear to be thicker 2-6 nms compared to those in case with the embodiment 1, even though those diameters are distributed mainly within the range of 10-30 nms similar to the case with the embodiment 1.

D. Pre-Treating Step of the Surface of the Carbon Nano Tube for Supporting Platinum-Based Nano Catalyst:

The same method illustrated in step D in the embodiment 1 was used.

E. Step of Platinum-Based Nano Catalyst Supporting by Flowing the Vapor Phase Platinum Precursor to the Carbon Nano Tube Grown on the Surface of the Carbon Paper The same method illustrated in step D in the embodiment 1 was used.

COMPARATIVE EXAMPLE 1

After making the platinum-based nano catalyst with the impregnant method in accordance with the related art, an electrode for fuel cell is manufactured using a paste method which pastes the platinum-based nano catalyst on a carbon paper.

A. Step of Manufacturing Platinum-based Nano Catalyst (Impregnant Method)

The platinum particle is supported on the surface of the carbon nano tube by separating the carbon nano tube only from the material manufactured by the method of embodiment 1 and using a chloroplatinic acid ($H_2PtCl_6$) as a platinum-based nano catalyst by dissolving this on distilled water. The carbon nano tube is added to the solution where the precursor is dissolved, treated with ultrasonic waves (60 Hz) for 2~6 hours, and then is reduced by using $NaBH_4$. The obtained material is filtered by a filter paper and is dried in the air at 110° C. for 12 hours after being dried in the air for 12 hours.

B. Step of Pasting the Platinum-based Nano Catalyst on the Carbon Paper (Paste Method)

Carbon nano tube mixture is manufactured by adding the carbon nano tube powder supported with the platinum manufactured in accordance with the step A into a Nafion solution and treating with ultrasonic waves for 2 hours. The carbon nano tube electrode formed with a platinum-based nano catalyst layer is manufactured by repeating processes of pasting the manufactured carbon nano tube mixture on a carbon paper and drying it at the temperature of 60° C.

TEST EXAMPLE 1

The Platinum Contents in Accordance with Temperature

Test Method

The platinum content regarding the platinum-based nano catalyst supported carbon nano tube obtained is measure by varying the reaction temperatures 80-300° C. with keeping the other conditions the same as in the embodiments 1-9

Test Result

Figure 6:
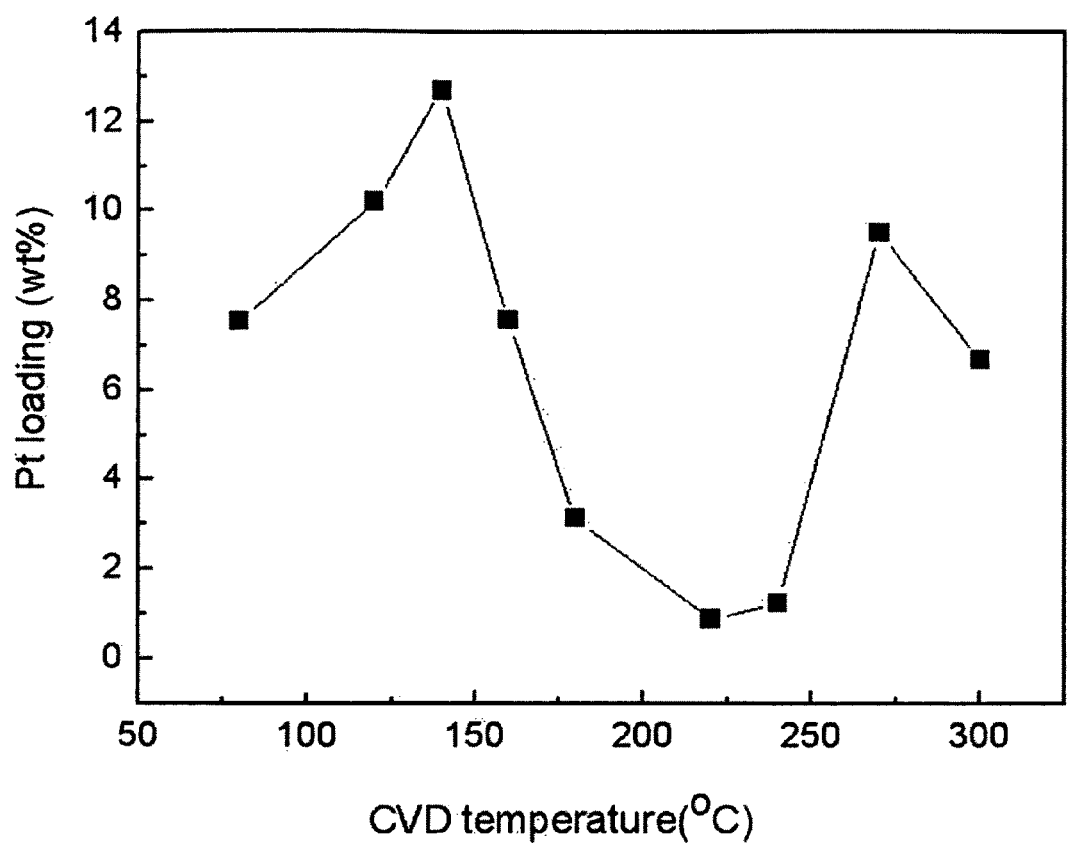
FIG. 6 is a graph comparing the supporting amount of platinum in embodiments 1~9 (nitrogen gas).

The graph of the measurement result of the platinum content is illustrated in FIG. 6. The supporting amount of the platinum shows much discrepancies according to the reaction temperatures even when the other conditions were kept the same and the platinum content shows the maximum with the embodiment 1 which kept the reaction temperature at 140° C. among those conditions of embodiments 1~9. And it is verified that the supporting amount decreases abruptly above the temperature of 160° C., and that the platinum support amount increases again when the reaction temperature is raised above 250° C. And it is shown that it is possible to control the platinum amount to optimum suitable for each usage by controlling the temperature condition.

TEST EXAMPLE 2

The Platinum Contents in Accordance with Reaction Gas

Test Method

The platinum content regarding the obtained materials is measured by changing the temperature condition in the embodiments 1~9 where only nitrogen gas is flown as a reaction gas, 10~18 where oxygen is additionally flown, and 19~25 where hydrogen is additionally flown respectively.

Test Result

As illustrated in FIG. 6 of the test example 1, as a result performed at temperatures different from each other in the condition where nitrogen is flown, the platinum amount supported by the CVD increases in accordance with the increase of the temperature and shows its maximum at 140° C. and shows a decreasing tendency and increases again when the temperature is raised above 250° C.

Figure 7:
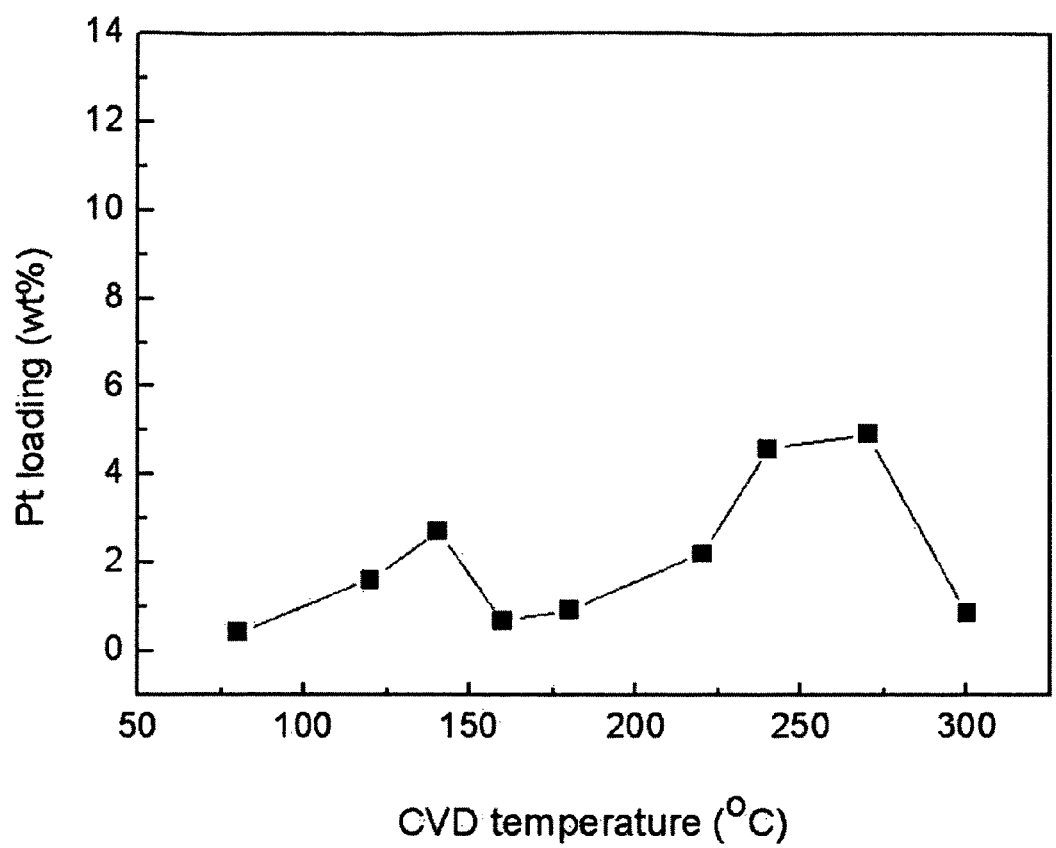
FIG. 7 is a graph comparing the supporting amount of platinum in embodiments 10~18 (nitrogen+oxygen gas).

The measurement result graph of the platinum content regarding the embodiments, 10~18 where nitrogen and oxygen are flown, is illustrated in FIG. 7. As illustrated, the platinum support amount shows a tendency similar to the case with nitrogen that the amount increases up to 140° C. in accordance with the increase of the temperature and decreases above this temperature, then increases again and shows the maximum value in the range of 240-270° C. The platinum content shows its maximum when the platinum reaction temperature is set to 200° C., however, the support content appears to be less compared to the support content of the embodiment 1~9 where nitrogen is used as reaction gas.

Figure 8:
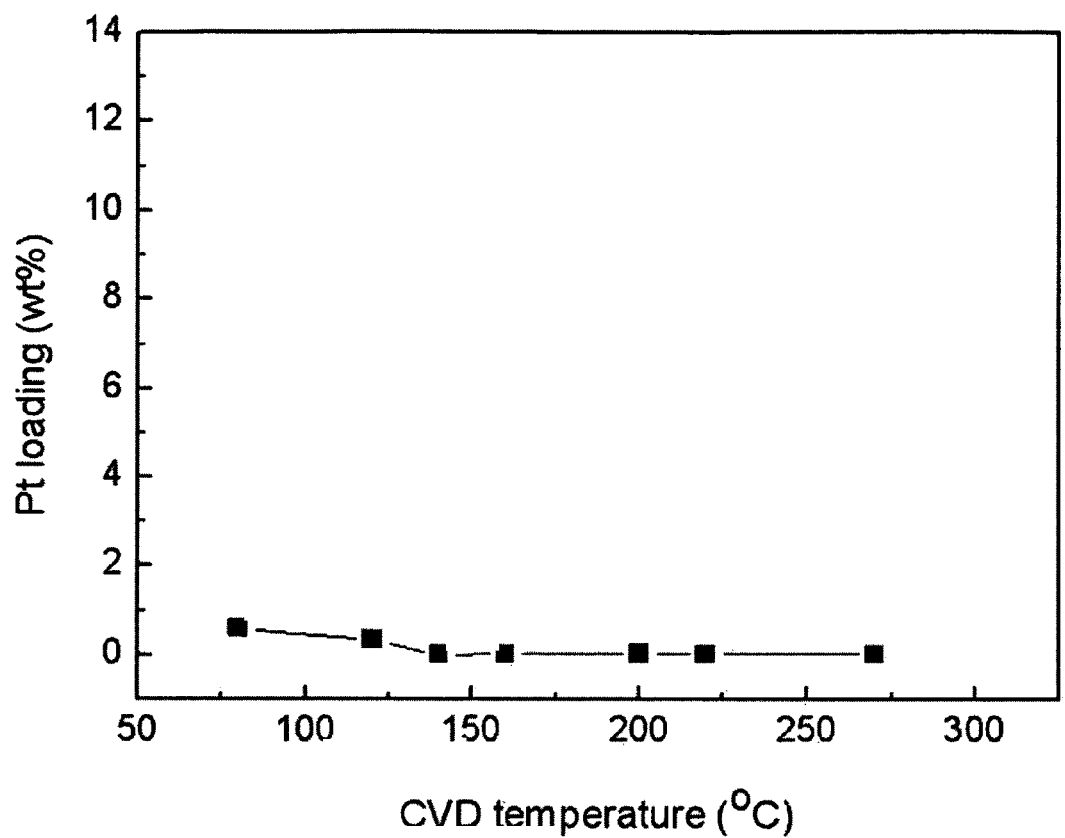
FIG. 8 is a graph comparing the supporting amount of platinum in embodiments 19~25 (nitrogen+hydrogen gas).

The measurement result graph of the platinum content regarding the embodiments 19~25, where nitrogen and hydrogen are additionally flown, is illustrated in FIG. 8. In this case, the support amount of platinum shows a similar value irrelevant to the reaction temperature, however, the support amount appears to be apparently small compared to the embodiments 1-9 where only nitrogen is used as a reaction gas generally. This shows that the case which uses nitrogen only as a reaction gas is the best condition for supporting of platinum-based catalyst and also shows that the support amount of platinum can be controlled by controlling the reaction gas.

TEST EXAMPLE 3

Comparison of CO Adhesion Amount Per Unit Platinum Mass of Platinum-Based Nano Catalyst Supported Carbon Nano Tube Test Method The CO adhesion amounts per unit platinum mass of platinum-based nano catalyst supported carbon nano tube which is obtained from the embodiment 1 manufactured in accordance with embodiments and from the comparison example 1 manufactured in accordance with the related art are measured.

Test Result

Figure 9:
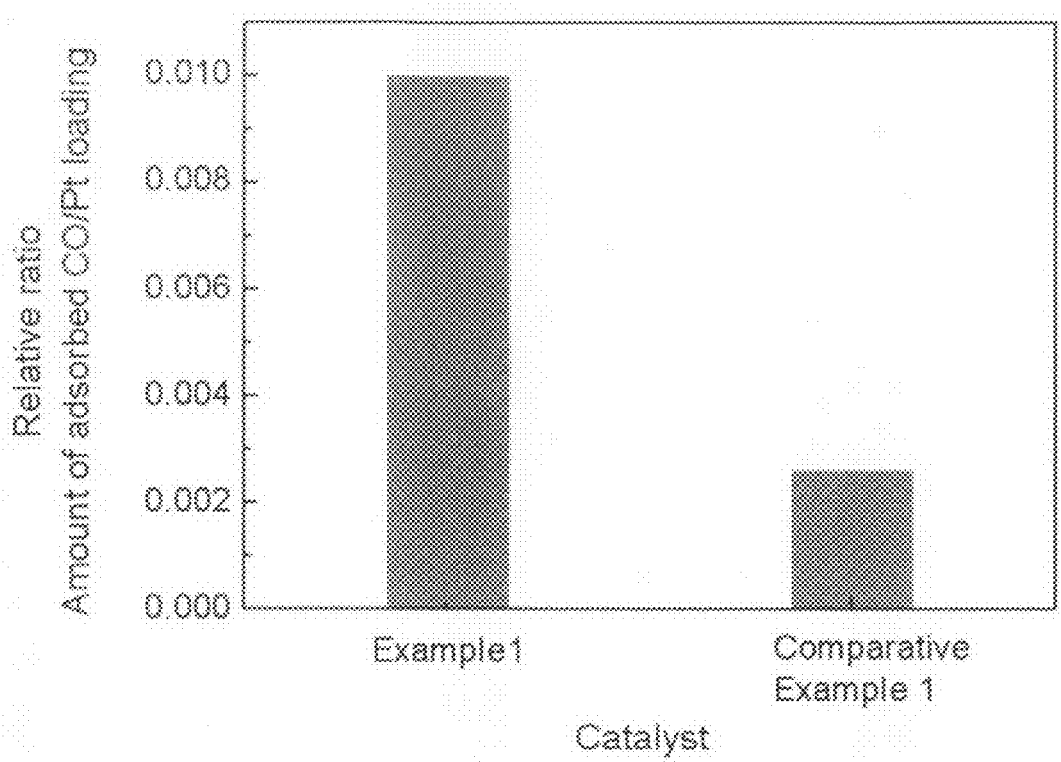
FIG. 9 is a graph comparing the CO adhesion amount per unit platinum mass of the platinum-based nano catalyst supported carbon nano tube electrode manufactured in the embodiment 1 and the comparison example 1.

The measurement result of CO adhesion amounts per unit platinum mass of platinum-based nano catalyst supported carbon nano tube manufactured in the embodiment 1 and in the comparison example 1 is illustrated in FIG. 9. CO which is used as a probe molecule is known to selectively adhere to activity of platinum-based catalyst. As illustrated in the graph of FIG. 9, the CO adhesion amount in case of the embodiment 1 is measured about 4 times larger than that of the comparison example 1. This means that the size of the platinum particle created by the CVD in case of the embodiment 1 is still smaller and uniform compared to the platinum particle created by the impregnant method of the comparison example 1. By this, according to the manufacturing method in accordance with embodiments, it is verified that more efficient catalyst effect can be achieved than an existing method by using even smaller amount of platinum precursor.

TEST EXAMPLE 4

Comparison of Mass Activity Per Unit Platinum Mass of Platinum-based Nano Catalyst Supported Carbon Nano Tube Test Method The mass activities per unit platinum mass of platinum-based nano catalyst supported carbon nano tube manufactured in the embodiment 1 and in the comparison example 1 are measured. The measurement is performed at 0.9V with regard to reversible hydrogen electrode (RHE).

Test Result

Figure 10:
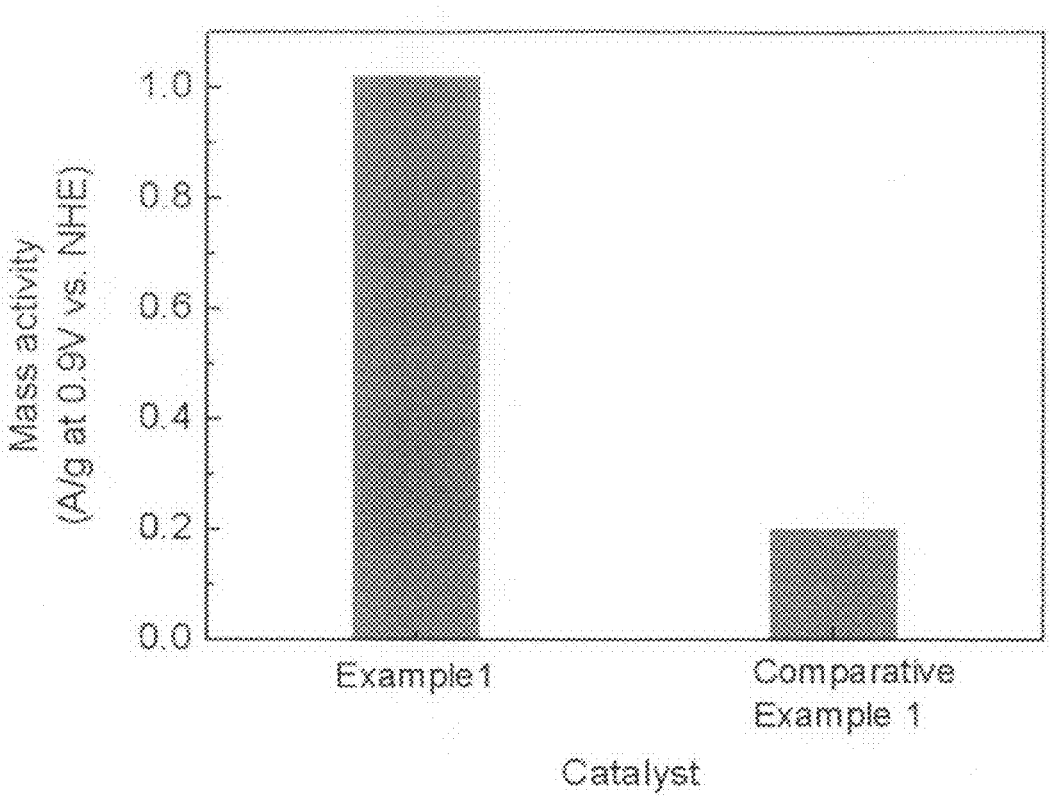
FIG. 10 is a graph comparing the mass activity per unit platinum mass of the platinum-based nano catalyst supported carbon nano tube electrode manufactured in the embodiment 1 and the comparison example 1.

The measurement result is illustrated in FIG. 10. As illustrated in FIG. 10, in the embodiment 1 in accordance with the present invention, mass activity appears about 5 times electrically active compared with the case of the comparison example 1. The above result means that the effective surface area which participates in the reaction is relatively broad compared to the case of comparison example 1 as the carbon nano tube is dispersed uniformly in a shape that is perpendicular to the electrode plane in case of the embodiment 1, and means that the size of the platinum particle created by the CVD in case of the embodiment 1 is still smaller and uniform compared to the platinum particle created by the impregnant method of the comparison example 1. In other words, the durability of the electrode is expected to significantly increase for moisture which is by product generated during the operation of a fuel cell can be easily discharged as oriented vertically.

It will be apparent to those skilled in the art that various modifications and variations can be made to embodiments without departing from the spirit or scope of the disclosed embodiments. Thus, it is intended that the present invention covers modifications and variations of this invention provided they come within the scope of the appended claims and their equivalents.

What is claimed is:

1. A method comprising:
   pre-treating a surface of a carbon paper configured to grow a carbon nano tube by a method comprising submerging the carbon paper into sulfuric acid to improve the wettability of the surface of the carbon paper;
   forming a catalyst metal over a surface of the pre-treated carbon paper;
   growing the carbon nano tube by flowing a vapor phase carbon source on the surface of the carbon paper supported with the catalyst metal and maintaining an a predetermined temperature range;
   removing the catalyst metal from the grown carbon nano tube and pre-treating the surface of the carbon nano tube; and
   forming a platinum-based catalyst by flowing a vapor phase platinum-based precursor on the carbon nano tube to form a platinum-based nano catalyst supported carbon nano tube electrode.

2. The method of claim 1, wherein the catalyst metal comprises at least one of nickel, cobalt, and iron.

3. The method of claim 1, wherein said pre-treating the surface of the carbon paper further comprising submerging the carbon paper into a sulfuric acid solution of approximately 0.1~0.5 mol treating at approximately −0.15 to approximately 1.3 V with a sweep rate at approximately 50 mV/s for approximately 10-60 cycles.

4. The method of claim 1, wherein said forming the catalyst metal comprises ultrasonic processing.

5. The method of claim 4, wherein:
said pre-treating the surface of the carbon paper comprises submerging the surface of the carbon paper into a sulfuric acid solution and drying the pre-treated carbon paper; and
said forming a catalyst metal comprises submerging the dried pre-treated carbon paper into a precursor solution comprising the catalyst metal, wherein the ultrasonic processing disperses the catalyst metal in the precursor solution on the surface of the carbon paper substantially uniformly, wherein an ultrasonic processing procedure is repeated at least one time to substantially control a support density of the catalyst metal, wherein the ultrasonic processing procedure comprises air drying the carbon paper between ultrasonic processes.

6. The method of claim 5, wherein the precursor solution is dissolved with nitrate or acetate.

7. The method of claim 5, wherein:
the precursor solution is an approximately 0.1 to approximately 1 mol precursor solution; and
the ultrasonic processing procedure is repeated between one and ten times.

8. The method of claim 1, wherein said forming the catalyst metal comprises electro-chemical processing.

9. The method of claim 8, wherein the electro-chemical processing comprises:
installing a three electrode cell by connecting a saturated calomel electrode as a reference electrode, a platinum electrode as a counter electrode, a carbon paper as a working electrode;
submerging the electrode cell into a solution of the catalyst metal and controlling deposition of metal particles by repeating a submerging procedure at least one time while varying a voltage within a predetermined range; and
removing moisture by picking out a graphite electrode supported with metal particles from the solution and drying the electrode in an oven.

10. The method of claim 1, wherein said forming the catalyst metal is performed by electro-chemical processing comprising:
installing a three electrode cell by connecting a saturated calomel electrode as a reference electrode, a platinum electrode as a counter electrode, a carbon paper as a working electrode;
submerging the electrode cell into an approximately 0.1 to approximately 1 mol solution of the catalyst metal and controlling the deposition of metal particles by repeating a submerging procedure with varying voltage within a range of approximately −2.5 to approximately 2.5V at approximately 10 cycles to approximately 600 cycles with a sweep rate between approximately 10 mV/sec to approximately 50 mV/sec; and
removing moisture by picking out the graphite electrode formed with the catalyst metal from the solution and drying the electrode in an oven at the temperature between approximately 100° C. and approximately 120° C. for approximately 12-24 hours.

11. The method of claim 1, wherein said growing the carbon nano tube comprises:
installing the carbon paper formed with the catalyst metal in a quartz tube positioned inside of a furnace, maintaining the internal pressure between approximately 6 and approximately 10 Torr for approximately 30 minutes, and flowing nitrogen between approximately 50 and approximately 300 sccm at room temperature for at least approximately one hour;
flowing hydrogen between approximately 30 sccm and approximately 150 sccm for the reduction of the catalyst metal and raising the temperature between approximately 450° C. and approximately 500° C. for approximately 2 hours; and
raising the temperature continuously at the speed of 10° C./min and flowing in at least one of benzene, ethyl alcohol, xylem, and methane gas between approximately 10 sccm and approximately 300 sccm, which is used as a carbon source at a point when the internal temperature of the quartz tube reaches between approximately 600° C. and approximately 800° C. and maintained between approximately 30 minutes and 6 hours while growing the carbon nano tube on the surface of the carbon paper.

12. The method of claim 1, wherein said removing the catalyst metal comprises:
performing a hydrochloric acid treatment to remove a component of the catalyst metal which is used as a catalyst at the carbon nano tube grown on the surface of the carbon paper;
submerging the carbon paper into the hydrochloric acid solution between approximately 6 mol and approximately 10 mol between approximately 6 hours and approximately 24 hours and drying the carbon paper an oven between approximately 100° C. and approximately 120° C. between approximately 12 hours to 24 hours after rinsing the carbon paper with distilled water;
submerging a sample into a mixture acid solution comprising the 14M of nitrate and 98% sulphuric acid with a volume ratio of 1:1 in order to improve the wettability of the surface of the carbon nano tube, substitute oxidation radicals, and to create physical defects and performing treatment between approximately 5 and approximately 360 minutes while refluxing; and
rinsing the treated sample with distilled water a number of times and drying the rinsed sample in an oven at the temperature between 100° C. and approximately 120° C. between approximately 12 and approximately 24 hours.

13. The method of claim 1, wherein said forming the platinum-based catalyst comprises:
placing the carbon paper in the middle of the quartz tube and removing impurities inside of the quartz tube by maintaining a predetermined pressure and a predetermined temperature for a predetermined period of time, after said removing the catalyst metal;
flowing nitrogen on the carbon paper for a predetermined period of time;
changing by raising the internal temperature of the quartz tube using a CVD method;
flowing in the vapor phase platinum precursor at the point when the reaction temperature is reached and maintaining the temperature for a predetermined amount of time to form platinum particles on the surface of the carbon nano tube.

14. The method of claim 1, wherein said forming the platinum based catalyst comprises:

placing the carbon paper in the middle of a quartz tube and removing impurities inside of the quartz tube by maintaining the temperature between approximately 100° C. and approximately 120° C. at a pressure between approximately 6 Torr and approximately 10 Torr for approximately 30 minutes;

flowing nitrogen between approximately 50 sccm and approximately 300 sccm on the carbon paper for approximately 1 hour;

changing the internal temperature of the quartz tube up to a predetermined temperature with a temperature raising speed of approximately 10° C./min to form the platinum-based catalyst using a CVD method;

flowing the vapor phase platinum precursor at the point when the reaction temperature is reached and maintaining the temperature for approximately 30 minutes to approximately 24 hours to form platinum particles on the surface of the carbon nano tube.

15. The method of claim 14, wherein the vapor phase platinum precursor is characterized in that:

the precursor is evaporated by placing and heating the platinum precursor into the evaporator installed inside of a heating oven configured to form the platinum particle on the surface of the carbon nano tube which is grown on the carbon paper; and when the temperature of the precursor reaches a predetermined temperature, the vapor phase platinum precursor is configured to be transferred to the carbon paper placed inside of the quartz tube following the flow of the nitrogen which is a carrier gas by switching the path from directly flowing into the quartz tube to flow into the evaporator, maintaining the temperature of a connecting tube which connects the heating oven where the evaporator is installed and a furnace to heat the quartz tube, and the platinum precursor is configured to start to flow into the quartz tube at the point when the temperature of the carbon paper reaches the reaction temperature.

16. The method of claim 14, wherein the vapor phase platinum precursor is characterized in that the precursor is evaporated by placing the platinum precursor into the evaporator installed inside of a heating oven configured to form the platinum particle on the surface of the carbon nano tube which is grown on the carbon paper and raising the temperature up to the evaporation temperature of the precursor, wherein when the temperature of the precursor reaches between approximately 60° C. and approximately 80° C., the vapor phase platinum precursor is configured to be transferred to the carbon paper placed inside of the quartz tube following the flow of the nitrogen between approximately 10 sccm and approximately 300 sccm which is a carrier gas by switching the path from directly flowing into the quartz tube to flow into the evaporator, maintaining the temperature of a connecting tube which connects the heating oven where evaporator is installed and a furnace to heat the quartz tube between approximately 60° C. and approximately 80° C., and the platinum precursor is configured to start to flow into the quartz tube at a time when the temperature of the carbon paper reaches the reaction temperature.

17. The method of claim 1, wherein the platinum precursor uses methyl tri methyl cyclopentadienyl platinum and the evaporator is installed inside of an oven that is heated at a temperature ranging between approximately 60° C. and approximately 80° C.

\* \* \* \* \*